(12) United States Patent
Bahn

(10) Patent No.: US 6,369,481 B1
(45) Date of Patent: Apr. 9, 2002

(54) POLYPHASE RELUCTANCE MOTOR

(75) Inventor: Itsuki Bahn, Nerima-ku (JP)

(73) Assignee: Kabushikigaisha Sekogiken, Tokyo (JP)

(*) Notice: Subject to any disclaimer, the term of this patent is extended or adjusted under 35 U.S.C. 154(b) by 624 days.

(21) Appl. No.: 08/809,052

(22) PCT Filed: Jul. 15, 1996

(86) PCT No.: PCT/JP96/01972
§ 371 Date: Mar. 10, 1997
§ 102(e) Date: Mar. 10, 1997

(87) PCT Pub. No.: WO97/04520
PCT Pub. Date: Feb. 6, 1997

(30) Foreign Application Priority Data

Jul. 18, 1995 (JP) ............................................. 7-210918

(51) Int. Cl.[7] .............................................. H02K 17/02
(52) U.S. Cl. ........................ 310/166; 310/168; 310/180
(58) Field of Search ............................... 310/168, 68 R, 310/68 B, 166, 261, 254, 180; 318/701

(56) References Cited

U.S. PATENT DOCUMENTS 4,305,072 A  * 12/1981 Makita .................. 340/870.31
4,647,802 A  * 3/1987 Konecny .................. 310/49 R
5,239,217 A  * 8/1993 Horst ........................... 310/51
5,485,047 A  * 1/1996 Bahn ........................... 310/166

FOREIGN PATENT DOCUMENTS

| EP | 0 577 843 | 1/1994 |
| EP | 0 632 572 | 1/1995 |
| EP | 0 662 751 | 7/1995 |
| JP | 5-207784 | 8/1993 |
| JP | 5-244795 | 9/1993 |
| JP | 5-308795 | 11/1993 |
| JP | 6-062551 | 3/1994 |
| JP | 7-039191 | 2/1995 |
| JP | 7-046808 | 2/1995 |
| JP | 7-194178 | 7/1995 |
| JP | 7-312896 | 11/1995 |
| JP | 8-037791 | 2/1996 |

* cited by examiner

Primary Examiner—Tran Nguyen
(74) Attorney, Agent, or Firm—Staas & Halsey LLP

(57) ABSTRACT

A reluctance type motor comprising a rotor (1), which has n units (n is an integer of 2 or more) of salient poles (1a, 1b).of the same widths and arranged at regular intervals, and a stator armature (16) including a polyphase magnetic poles (16a, 16b, 16c, . . . ) with armature coils (9a, 9b, 9c, . . . ) arranged confronting the outer periphery of the rotor (1). Two sets of adjacent magnetic poles (16a–16b, 16b–16c, . . . ) are successively excited to magnetically attract the salient poles (1a, 1b) so that all of the salient poles act to contribute to torque output without interruption.

4 Claims, 6 Drawing Sheets

POLYPHASE RELUCTANCE MOTOR

TECHNICAL FIELD

The present invention relates to a polyphase reluctance motor designed so that its torque characteristic with respect to an exciting current is linear, and a large output torque can be obtained at a high-speed rotation.

BACKGROUND ART

Although it is characteristic of a reluctance motor to output a large torque, a reluctance motor has scarcely been put to practical use because of its shortcomings such as low rotational speed, vibration, etc., except for uses for special purposes.

A known three-phase half-wave current-supply reluctance motor will be explained below with reference to FIG. 1. In FIG. 1, a reference numeral 16 denotes a stator armature formed of a silicon steel lamination. The stator armature has magnetic poles 16a, 16b, . . . 16f which are individually mounted with armature coils 17a-1, 17b-1, . . . 17f-1. A rotor 1 fixed to a rotary shaft 5 is formed with eight salient poles 1a, 1b, 1c, . . . 1h. When power is supplied to the armature coil 17b-1 and the armature coil 17e-1 situated in axial symmetry with the coil 17b-1 with the rotor 1 in a state as illustrated in FIG. 1, the rotor 1 is caused to rotate in a direction indicated by an arrow A. Then, when the rotor 1 rotates by an electric angle of 120°, power-supply is interrupted. Subsequently, when power is supplied to the coils 17c-1 and 17f-1 for an electric angle of 120°, the rotor 1 rotates in the same direction indicated by the arrow A.

As described above, when power is supplied to the armature coils in the order of [17a-1, 17b-1]→[17b-1, 17e-1]→[17c-1, 17f-1] . . . , the rotor 1 is rotated in the direction indicated by the arrow A.

Among the eight salient poles, two salient poles take part in a generation of rotational torque, with remaining six salient poles not taking part in the generation of rotational torque. But, if all salient poles simultaneously take part in the generation of torque, it is considered that the torque is increased accordingly. However, such a practical technique has not been developed yet.

Moreover, in the motor shown in FIG. 1, when power is supplied to the armature coils 17a-1 and 17d-1, magnetic poles 16a and 16d are attracted to a radial direction, so that the stator armature 16 is deformed due to an at traction force. When the rotor 1 is further rotated and power is supplied to the armature coils 17b-1 and 17e-1, magnetic poles 16b and 16e are attracted to a radial direction by means of magnetic poles 1a and 1e, and, likewise, the stator armature 16 is deformed.

When the rotor 1 is further rotated and power is supplied to the armature coils 17c-1 and 17f-1, magnetic poles 16c and 16f are attracted towards a radial direction by means of magnetic poles 1a and 1e, likewise causing the stator armature 16 to be deformed. In this manner, the deforming direction of the stator armature 16 successively shifts as the rotor 1 rotates. For this reason, such a deformation of which direction varies successively may give rise to a vibration, and may not keep constant an air gap between a salient pole and a magnetic pole. As a result, vibration produces noise during rotation of the motor and useful life of bearing in the rotary shaft of the rotor 1 to be shortened. Thus, in a motor of large-size and great-output, it is difficult to solve the aforesaid problems.

DISCLOSURE OF THE INVENTION

An object of the present invention is to provide a polyphase reluctance motor which is capable of obtaining a large output torque and suppressing vibration during operation.

To achieve the above object, the present invention provides a polyphase (N phase: N is a positive integer of 2 or more) reluctance motor comprising: a rotor of soft magnetic substance which is provided with n units of salient poles (n is a positive integer of 2 or more) of the same width and the same interval in circumferential direction thereof; a stator armature having m×n (m is an integer of 3 or more) units of magnetic poles which are formed by winding an armature coil around each two adjacent slots out of m×n units of slots formed at equal intervals in a circumferential direction thereof, said armature coils being connected to constitute a first-phase armature coil, a second-phase armature coil, a third-phase armature coil . . . , and an Nth-phase armature coil; means for rotatably supporting said rotor with respect to said stator armature so that said salient poles of said rotor and said magnetic poles of said stator armature confront each other through a slight gap; position detecting units for detecting rotational position of each salient pole of said rotor, and outputting first-phase, second-phase, third-phase . . . , and Nth-phase position detection signals of the same width, which are successively delayed by a predetermined period; semiconductor switching elements connected in series to each of said first-phase armature coil, second armature coil, third-phase armature coil . . . , and Nth-phase armature coil; a DC power source which supplies power to each of said phase armature coils through said semiconductor switching elements connected in series therewith; and a power-supply control circuit for controlling the activation of said semiconductor switching elements according to said first-phase, second-phase, third-phase . . . , and Nth-phase position detection signals outputted from said position detecting units, so that said first-phase armature coil may be supplied with power simultaneously with said second-phase armature coil during a section, said second-phase armature coil may be supplied with power simultaneously with said third-phase armature coil during a section, . . . , and said Nth-phase armature coil may be supplied with power simultaneotisly with said first-phase armature coil during a section.

Further, a first magnetic pole formed in said stator armature is magnetized simultaneously with a second magnetic pole adjacent thereto in a predetermined direction in a manner such that one is magnetized N pole while the other is magnetized S pole, then, the second magnetic pole is magnetized simultaneously with a third magnetic pole adjacent thereto in a predetermined direction in a manner such that one is magnetized N pole while the other is magnetized S pole, and then, the third magnetic pole is magnetized simultaneously with a fourth magnetic pole adjacent thereto in a predetermined direction in a manner such that one magnetized N pole while the other is magnetized S pole, thereby generating a leakage flux passing through one of two adjacent magnetic poles, of which confronting area with a salient pole is smaller, which is effective for developing a torque between the magnetic poles and the salient pole, and of which quantity is determined according to the quality of the magnetic flux passing through the other of the above two adjacent magnetic poles.

As the motor of the present invention has the construction as described above, the following effects can be obtained; (a) since output torque is generated by simultaneously exciting adjacent magnetic poles N and S poles to magnetically attract the salient pole, output torque can be obtained twice or three times as much as in the case of the conventional motor; (b) an air gap between the magnetic poles of the stator armature and the salient poles of the rotor is set within 1/10 millimeter, so that a linearly proportional relationship can be established between current and output torque without torque saturation; therefore a large output torque can be obtained; and (c) all of salient poles of the rotor contribute to output torque without interruption, so that a large output torque can be obtained.

BEST MODE FOR CARRYING OUT THE INVENTION

Figure 2:
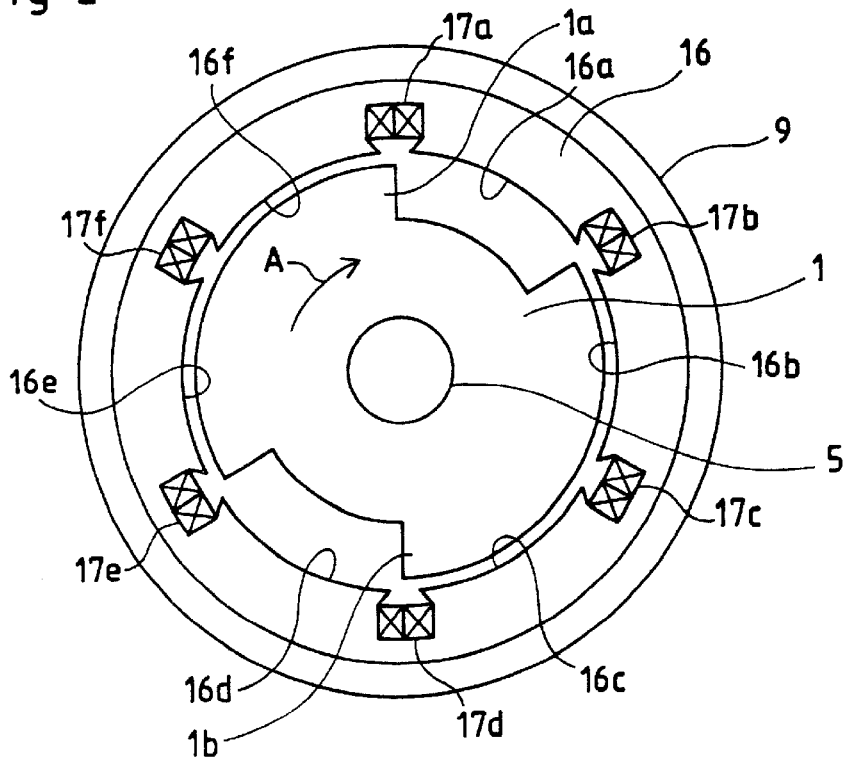
FIG. 2 is a cross sectional view of a stator armature and a rotor of a three-phase reluctance motor according to one embodiment of the present invention.

Referring now to FIG. 2, the structures of a stator armature and a rotor of the three-phase reluctance motor according to one embodiment of the present invention is described below.

Figure 4:
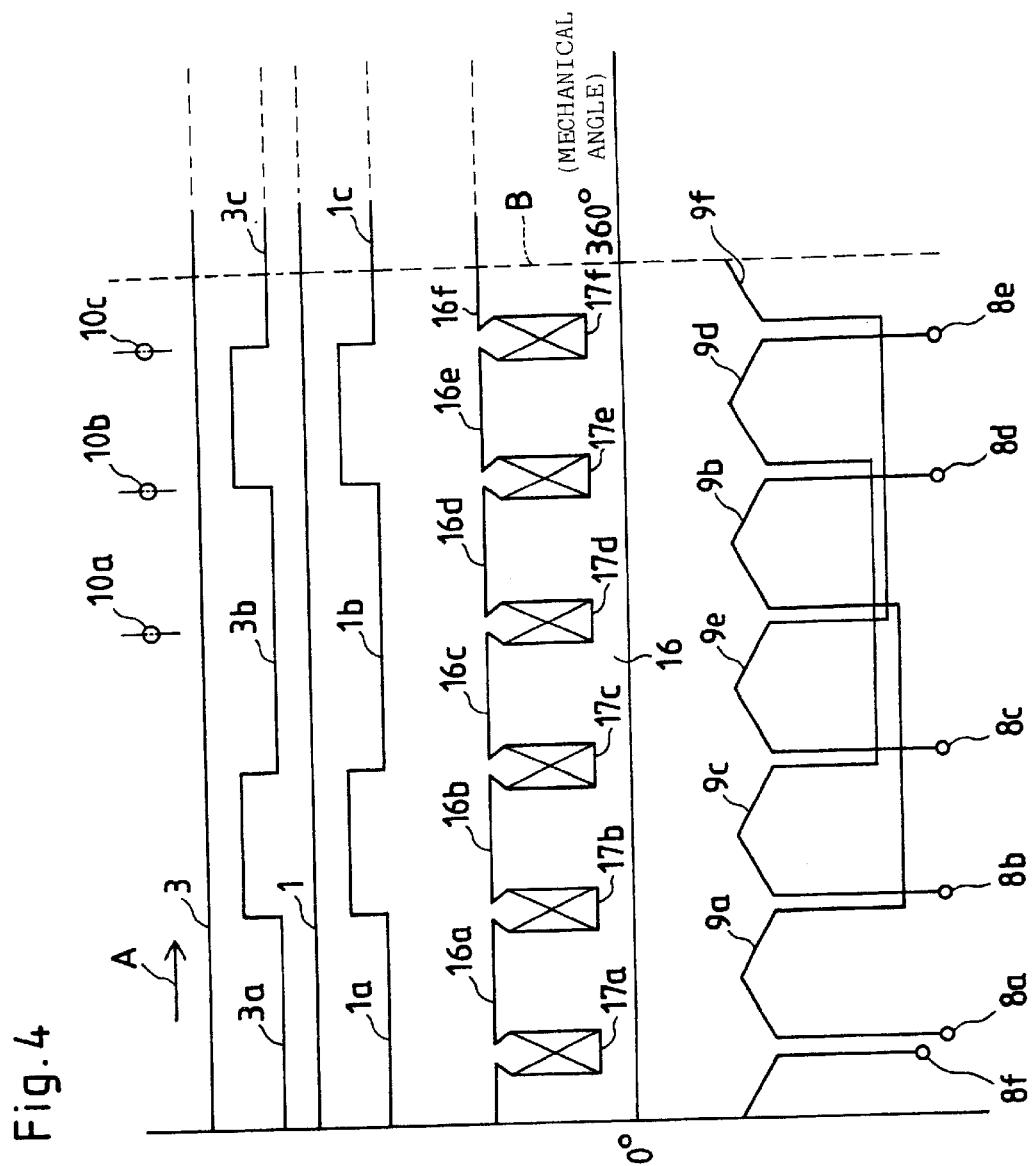
FIG. 4 is a development diagram of the rotor, stator armature and armature coil of the three-phase reluctance motor shown in FIG. 2.

The inside of an outer casing 9 is fixedly attached with a cylindrical stator armature 16. The stator armature 16 is made from a silicon steel lamination using a known method. An inner peripheral surface of the armature 16 is formed with six slots 17a, 17b, . . . 17f at constant angular intervals. Armature coils 9a, 9c, 9e, 9b, 9d and 9f, which will be described later with reference to FIG. 4, are wound around a portion between adjacent slots 17a and 17b, 17b and 17c, . . . 17f and 17a of the armature 16, respectively. In the armature 16, respective armature coils are wound around each of portions between adjacent slots so that magnetic poles 16a, 16, . . . 16f are formed. These adjacent slots are separated from each other by an electric angle of 120°. Hereinafter, the angular indication is of electric angle unless specified otherwise.

A rotary shaft 5, which is fixedly attached with a rotor 1, is rotatably supported by bearings (not shown) mounted on both sides of the outer casing 9 in its axial direction (the direction perpendicular to the paper surface of FIG. 2). This rotor 1 is of soft magnetic substance, and is made from the same silicon steel lamination as the stator armature 16. An outer periphery of the rotor 1 is provided with two salient poles 1a and 1b each being 240° wide and separated from each other by 120°. The outer peripheral surfaces of salient poles 1a, and 1b are opposed to magnetic poles 16a, 16b, . . . 16f through an air gap of about 0.1 millimeter.

The left-hand side portion from a broken line B representing a mechanical angle 360° in FIG. 4 corresponds to the development diagram of the rotor 1 and the armature 16 shown in FIG. 2. Reference numerals used in common in FIG. 4 and FIG. 2 denote the same components.

In FIG. 4, a reference numeral 9a denotes an armature coil wound around the portion between adjacent slots 17a and 17b. A reference numeral 9c denotes an armature coil wound around the portion between adjacent slots 17c and 17d, and a reference numeral 9e denotes an armature coil wound around the portion between adjacent slots 17a and 17b.

Moreover, a reference numeral 9b denotes an armature coil wound around the portion between adjacent slots 17d and 17e, a reference numeral 9d denotes an armature coil wound around the portion between adjacent slots 17e and 17f, and a reference numeral 9f denotes an armature coils wound around the portion between adjacent slots 17f and 17a.

Among these armature coils 9a, 9b . . . 9f, armature coils 9a and 9b are connected in series, and power is supplied through terminals 8a and 8d. Armature coils 9c and 9d are connected in series and power is supplied through terminals 8b and 8e. Armature coils 9e and 9f are connected in series, and power is supplied through terminals 8c and 8f. Each of intervals between armature coils 9a and 9c, 9c and 9c, 9e and 9c . . . 9e and 9f is 120°. The aforesaid armature coils 9a–9b constitute a first-phase armature coil; armature coils 9c–9d constitute a second-phase armature coil; and armature coils 9e–9f constitute a third-phase armature coil, respectively.

If power is supplied to the first-phase armature coil 9a–9b when the rotor 1 is situated at a position returned leftward from the position shown in FIG. 4 by 120°, salient poles 1a and 1b are magnetically attracted by magnetic poles 16a and 16b to rotate in the direction indicated by an arrow A. Subsequently, when the rotor 1 reaches the position shown in FIG. 4 by rotating 120°, power supply to the armature coils 9a and 9b is discontinued, and power is supplied to the second armature coils 9c and 9d, then the rotor 1 further rotates toward the right-hand direction. Further, when the rotor 1 rotates by 120°, power supply to the armature coils 9c and 9d is discontinued, and power is supplied to the third armature coils 9e and 9f, then the rotor 1 further rotates toward the right-hand direction. As described above, when power is supplied to the first, second and third armature coil successively during a section of 120°, the rotor 1 rotates in the direction of arrow A, thus functioning as a three-phase half-wave excitation reluctance motor.

Hereinafter, the pair of armature coils 9a and 9b connected in series is referred to as a first-phase armature coil 39a, the pair of armature coils 9c and 9d connected in series is referred to as a second-phase armature coil 39b, and the pair of armature coils 9e and 9f connected in series is referred to as a third-phase armature coil 39c (see FIG. 4). Power-supply control circuits for these first-, second- and third-phase armature coils 39a, 39b and 39c will be described below with reference to FIG. 8.

Both the ends of the first-phase armature coil 39a are connected with transistors 20a and 20b, respectively, both the ends of the second-phase armature coil 39b are connected with transistors 20c and 20d, and both the ends of the third-phase armature coil 39c are connected with transistors 20e and 20f. These transistors 20a, 20b, 20c . . . function as switching elements, but other semiconductor elements having the same effect may be used in place of these transistors. Power to these first-, second- and third-phase armature coils 39a, 39b and 39c is supplied from positive and negative terminals 2a and 2b of a direct-current source.

Counterflow blocking diodes 49a-1, 49b-1 and 49c-1 are connected between the transistor 20a and the positive terminal 2a of the direct-current source, between the transistor 20c and the same, and between the transistor 20e and the same, respectively. Also, capacitors 47a, 47b and 47c are connected between transistors 20a and 20b, between transistors 20c and 20d, and between transistors 20e and 20f, respectively.

When inputs to lower-side input terminals of AND circuits 41a, 41b and 41c are at a high level, if a high-level electric signal is inputted to a terminal 42a which is an upper-side input terminal of the AND circuit 41a, transistors 20a and 20b are activated, causing the first-phase armature coil 39a to be supplied with power. Likewise, when a high-level electric signal is inputted to terminals 42b and 42c, transistors 20c and 20d and transistors 20e and 20f are activated, causing the first- and second-phase armature coils 39b and 39c to be supplied with power.

A voltage at a terminal 40 is a reference voltage for designating an exciting current. Changing of output torque is possible by varying the voltage of the terminal 40. When a power switch (not shown) is turned on, since an input level of a negative terminal of an operational amplifier 40b is lower than its positive terminal, an output of the operational amplifier 40b becomes a high level. Then, as described above, the transistors 20a and 20b are activated, and a voltage from the power source is applied to the power-supply control circuit for the first-phase armature coil 39a. A resistor 22a is used for detecting an exciting current of the first-phase armature coil 39a. A reference numeral 30a denotes an absolute circuit.

The input signal to the terminals 42a, 42b and 42c is an output signal from a position detector (which will be described later) for detecting rotational positions of salient poles 1a and 1b of the rotor 1, and it repeats a predetermined high-level period and a predetermined low-level period. The first-phase armature coil 39a is supplied with power for the period where the input signal of the terminal 42a is at a high level, the second-phase armature coil 39 is supplied with power for the period where the input signal of the terminal 42b is at a high, level, and the first-phase armature coil 39c is supplied with power for the period where the input signal of the terminal 42c is at a high level.

Next, with reference to FIG. 7, described in the following is the effects of counterflow blocking diodes 49a-1, 49b-1 and 49c-1 and capacitors 47a, 47b and 47c in the power-supply control circuit shown in FIG. 8.

Figure 7:
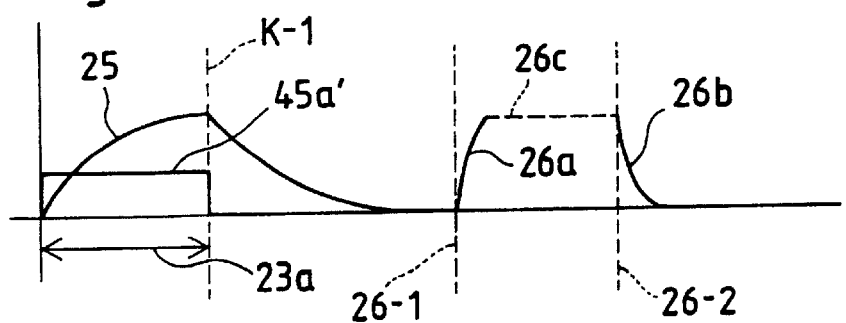
FIG. 7 is a graph showing the change in exciting current to the armature coil.
Figure 8:
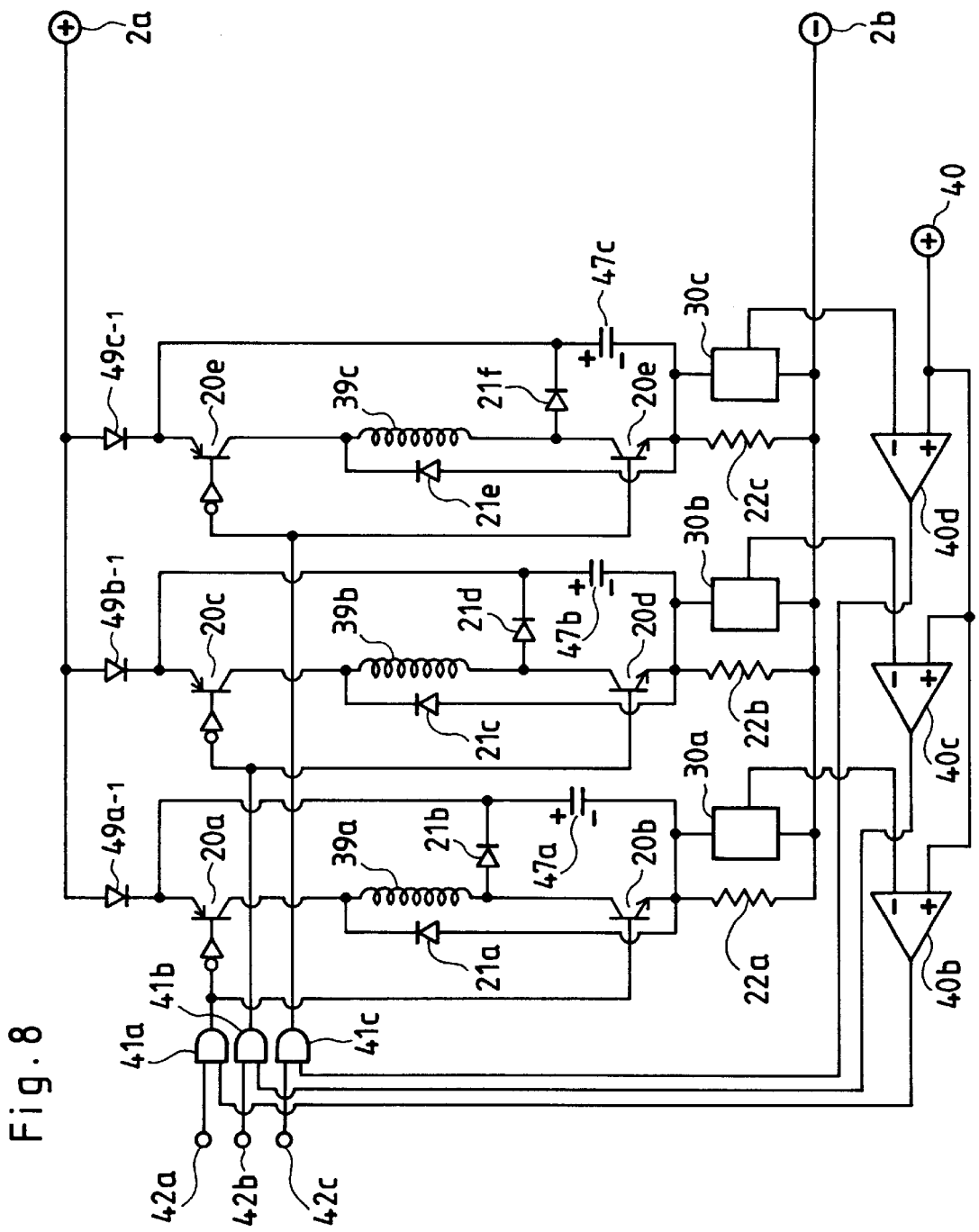
FIG. 8 is a block diagram of an power-supply control circuit of the three-phase reluctance motor.

In FIG. 7 showing a time chart of an exciting current, a curve 25 on the left-hand side of the figure represents a case where the counterflow blocking diode 49a-1 and the capacitors 47a are not connected to the first-phase armature coil 39a, while a curve 26a-26c-26b on the right-hand side of the figure represents a case where the counterflow blocking diode 49a-1 and the capacitors 47a are connected to the first-phase armature coil 39a as shown in FIG. 8.

Now, it is assumed that an input signal 45a' of 120° width as indicated by an arrow 23a is inputted to the input terminal 42a of the AND circuit 41a of the power-supply control circuit shown in FIG. 8, which is not provided with the counterflow blocking diode 49a-1 and the capacitors 47a, to activate transistors 20a and 20b. In this case, in the initial stage of power supplying, a build-up of the exciting current is delayed due to inductance of an armature coil.(see the left-hand side portion of the curve 25). Also, if power supplying is discontinued, a stored magnetic energy is returned and discharged to a power source through diodes 21a and 21b, so that the curve 25 gently falls as represented by a right-hand side portion of the curve with respect to a broken line K-1. A positive torque is generated in an interval of 120° width as indicated by the arrow 23a, so that the right-hand side portion of the curve 25 with respect to a broken line K-1 will bring about a countertorque, causing the fall of output torque and torque efficiency. In this condition, if the motor is to be rotated at a high speed, the torque efficiency will fall much more conspicuously until it is no longer applicable for practical use. This is the because the time width of the interval 23a where positive torque is generated is shortened in proportion to rotational speed although the time width of the interval where countertorque is generated remains unchanged.

A delay in the build-up of the curve 25 is also responsible for the fall of output torque, that is, the generation of a torque reduction. This is because a magnetic path is closed by the magnetic pole and the salient pole, and, as a consequence, the magnetic pole has a high inductance. Although the reluctance motor is advantageous in generating high output torque, it is disadvantageous in increasing its rotational speed because of the generation of the aforesaid countertorque and torque reduction.

Discussed in the foregoing is the explanation as to why countertorque and torque reduction are generated when power is supplied to the first-armature coil 39a which is not provided with the counterflow blocking diode 49a-1 and the capacitor 47a. Likewise, countertorque and torque reduction a regenerated when power is supplied to the second- and third-armature coils 39b and 39c which are not provided with the counterflow blocking diodes 49b-1, 49c-1 and the capacitor 47b, 47c.

As a known solution for the above problem, there is known one in which a phase is advanced before the salient pole confronts the magnetic pole, and then power supplying to the armature coil is started. When advanced-phase power-supply is made, a current rapidly rises up since the inductance of the magnetic pole is extremely small. However, at a point where the output torque starts to occur, that is, when the salient pole starts confronting the magnetic pole, the inductance rapidly becomes high, so that the current also falls rapidly. Thus, this method has problems such that output torque decreases and that the number of position detecting elements is required to be doubled in case of carrying out both normal and reverse rotation driving.

Next, if there is provided the power-supply control circuit as shown in FIG. 8 (i.e., the counterflow blocking diode 49a-1 and the capacitor 47a are provided thereto), the above problems can be solved. The reason will be explained below.

First, when power supply is discontinued, a magnetic energy stored in the first-phase armature coil 39a, prevented from returning to a DC power source by reverse current protection diode 49a-1, charges the capacitor 47a with the polarity as shown in FIG. 8 through diodes 21b and 21a without returning to the DC power side, thereby causing the voltage of the capacitor to be raised to a high-voltage. Thus, the magnetic energy rapidly disappears, causing the current to fall rapidly.

In the time chart of FIG. 7, the curve 26a-26c-26b represents a current curve flowing through the first-phase armature coil 39a in the power-supply control circuit of FIG. 8. An interval between broken lines 26-1 and 26-2 is 120° wide. The exciting current rapidly falls as represented by the curve 26b, so that countertorque is prevented from being generated, and the capacitor 47a is charged with and kept at a high voltage. When the next input signal is supplied to the terminal 42a, transistors 20a and 20b are again activated to supply power to the first-phase armature coil 39a. At this time, the voltage stored in the capacitor 47a is also applied to the first-phase armature coil 39a through these transistors 20a and 20b, so that a voltage, which is the sum of the power source voltage (voltage across the terminals 2a and 2b) and charging voltage of the capacitor 47a, is applied to the first-phase armature coil 39a. Therefore, the current in the first-phase armature coil 39a is rapidly built up as represented by the curve 26a, so that torque reduction can be prevented from developing therein.

The above is the explanation as to how countertorque and torque reduction will be reduced when power is supplied to the first-phase armature coil 39a provided with the counter-flow blocking diode 49a-1 and capacitor 47a. Likewise, when power is supplied to the second- and third-phase armature coils 39b and 39c provided with the counterflow blocking diode 49b-1, 49c-1 and capacitors 47b, 47c, both the countertorque and torque reduction can be reduced.

As described above, in the power-supply control circuit shown in FIG. 8, countertorque and torque reduction are prevented from developing, and power supply is made under the condition that the current waveform is a substantially rectangular wave, and thus it can be seen that output torque is increased.

Next, a chopper circuit will be described below with reference to FIG. 8. When a current flowing through the first-phase armature coil 39a is increased, causing the drop of the voltage of the resistor 22a for detecting the current to increase and the voltage of the first-phase armature coil 39a to exceed a voltage of the reference voltage terminal 40, an-output of an operational amplifier 40b becomes a low level, and the input to the lower side of the AND circuit 41a becomes a low level, so that transistors 20a and 20b becomes inactive, causing the excitation current to decrease. Then, when the current decreases by a predetermined value due to the hysterisis characteristics of the operational amplifier 40b, the output of the operational amplifier returns to a high level, and the transistors 20a and 20b are activated, causing the excitation current to increase. Thus, the excitation current is kept at a preset value by repeating the cycle as described above. The section shown by the broken line 26c in FIG. 7 is an interval where chopper control is effected. The pulse height of the broken line 26c is regulated according to the voltage of the reference voltage terminal 40. The above is the explanation about chopper control for a current in the first-phase armature coil 39a. Likewise, chopper control for a current in each of the second- and third-phase armature coils 39b and 39c can be effected.

Power supply to each of the armature coils 39a, 39b and 39c may be effected at either a point where the salient poles 1a and 1b begins to confront magnetic poles 16a, 16b, 16c . . . 16f or at, a point a little before the above point. The time of such power supply is adjusted according to the rotational speed, efficiency or output torque and determined by selecting the positions where the coils 10a, 10b and 10c constituting a position detecting element are fixed to the stator armature.

As seen from the above explanation, the three-phase half-wave power-supplying by the power-supply control circuit shown in FIG. 8 is efficient and capable of providing high output and high rotational speed. The three-phase half-wave power-supply type motor has a shortcoming such that a ripple is generated in its output torque. However, it can be overcome by employing three-phase full-wave power-supplying.

In this embodiment, moreover, respective-phase armature coils 39a, 39b and 39c are supplied with power by 240° (with phase difference of 120°). As a result, each of adjacent magnetic poles [16a, 16b], [16b, 16c] [16c, 16d] . . . [16f, 16a ] is magnetized so that one of these paired magnetic poles is N pole and the other S pole for the period of 120°. Further, magnetic poles 16a–16d, 16b–16e and 16c–16f situated at axially symmetrical positions are magnetized by means of armature, coils 9a, 9b; 9c, 9d; 9e, 9f, respectively so that polarities of the opposing poles differ from each other.

The following is an explanation about a device for detecting a rotational position of the rotor 1 and generating a signal to be inputted to the input terminals 42a, 42b and 42c of AND circuits 41a, 41b and 41c.

In the development diagram shown in FIG. 4, a reference numeral 3 denotes a position detecting rotor. The rotor 3 is of the same type as the rotor 1, rotates coaxially and is synchronously with the rotor 1, and made of a conductor. Specifically, the position detecting rotor 3 is formed with two salient poles 3a and 3b each having a width of 240° with an interval of 120°, like the aforesaid rotor 1. On the other hand, position detecting coils 10a, 10b and 10c are fixed to the motor body so that they face the surfaces of the salient poles 3a and 3b of the position detecting rotor 3 through a proper air gap. Respective position detecting coils 10a, 10b and 10c are made of air-core coil of 10 to 20 turns having a diameter of several millimeters. Further, these coils 10a, 10b and 10c are arranged with intervals of 120° as shown in FIG. 4.

Figure 6:
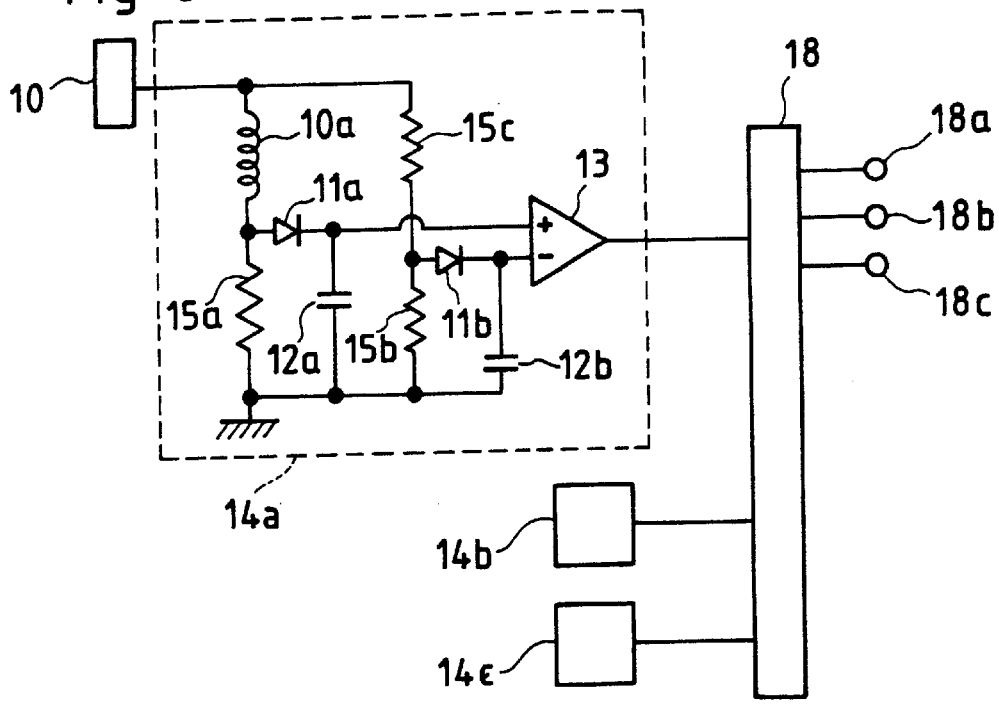
FIG. 6 is a block diagram of an electrical circuit for obtaining a positional detection signal of the three-phase reluctance motor.

A unit for obtaining position detecting signals from coils 10a, 10b and 10c will be described below with reference to FIG. 6. In FIG. 6, the coil 10a and resistors 15a, 15b and 15c constitute a bridge circuit. A reference numeral 10 denotes an oscillator which generates oscillation at about 2 megacycles. When the coil 10a does not face the salient poles 3a and 3b of the position detecting rotor 3 (i.e., it faces an air gap between the salient poles 3a and 3b), the coil 10a is adjusted so as to be in equilibrium. In such an equilibrium state, an output of a low pass filter comprising a diode 11a and a capacitor 12a becomes equal to an output of a low pass filter comprising a diode 11b and a capacitor 12b, so that an output of, an operational amplifier 13 becomes a low level. Then, when the coil 10a faces the salient poles 3a and 3b, since impedance is reduced due to ohmic loss, the voltage of resistor 15a rapidly falls, so that the output of the operational amplifier 13 becomes a high level. In addition to the bridge circuit 14a which comprises the coil 10a and is indicated in a block of broken lines, a pair of bridge circuits 14b and 14c which comprise the coil 10b and 10c respectively and each has the same circuit configuration as the bridge circuit 14a are provided. These bridge circuits 14a, 14b and 14c can use the oscillator 10 in common.

Respective outputs of bridge circuits 14a, 14b and 14c are inputted to a block circuit 18. In a time chart shown in FIG. 10, the output of the bridge circuit 14a is represented by curves indicated by reference numerals 45a, 45b . . . The curves 45a, 45b . . . each have a width of 240°, and there is an interval of 120° between the terminal end of the curve 45a and the starting end of the next curve 45b. Likewise, the outputs of the bridge circuit 14b and 14c are represented by curves indicated by reference numerals 46a, 46b . . . and 47a, 47b . . . Moreover, there is a phase difference of 120° between curves 45a and 46a, between curves 46a and 47a, and between curves 47a and 45a. The block circuit 18 shown in FIG. 6 is conventionally applied to a control circuit for a three-phase Y type semiconductor motor, and is a logical circuit for obtaining rectangular-wave electric signals of 240° from terminals 18a, 18b and 18c when the aforesaid position detecting signals are inputted. An output signal from the terminal 18a is inputted to the terminal 42a, an output signal from the terminal 18b is inputted to the terminal 42b, and an output signal from the terminal 18c is inputted to the terminal 42c.

Figure 5:
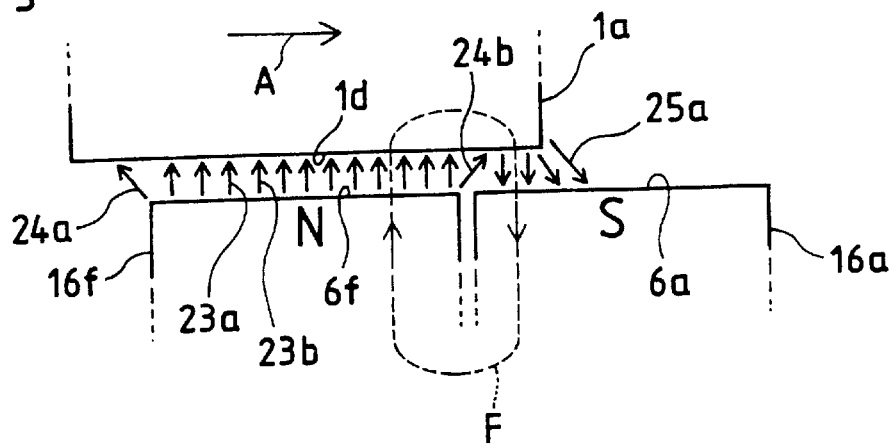
FIG. 5 is a diagram illustrating the principle on which rotational torque is generated in a three-phase reluctance motor according to the present invention.

Referring now to FIG. 5, a description of how two adjacent magnetic poles 16f and 16a simultaneously magnetized generate a torque with respect to the salient pole 1a is given below. A positional relationship between magnetic poles 16f and 16a and the salient pole 1a in FIG. 5 shows a state in which the rotor 1 of FIG. 4 has rotated toward the left-hand side by about 100°. In this case, power is supplied to the armature coil 9f (39c) of the magnetic pole 16f successively as shown by curves 45a, 45b . . . in FIG. 10, Also, power is supplied to the armature coil 9a (39a) of the magnetic pole 16a (39a) successively as represented by curves 45a, 45b . . . in FIG. 10. As a result, the armature coils 39c and 39a are simultaneously supplied with power only for the intervals indicated by arrows D and E. In other words, power supply is simultaneously given for a period (having a width of 120° and an interval of 240°) represented by curves 48a, 48b . . . in FIG. 10. The positional relationship between magnetic poles 16f and 16a and the salient pole 1a in FIG. 5 shows an initial state in simultaneous power supplying.

In FIG. 5, magnetic flux is generated as shown by arrows 23a, 23b, . . . in an air gap between an end face 1d of the salient pole 1a and an end face 6f of the magnetic pole 16f. When the length of air gap becomes about 0.1 millimeter, the magnetic flux becomes perpendicular to the end faces and will not contribute to torque. The magnetic flux from the opposite ends of the magnetic pole 16f has directions as shown by arrows 24a and 24b, so that the torque is offset. Consequently, the flux will not contribute to output torque. On the other hand, leakage flux shown by an arrow 25a is generated between the salient pole 1a and an end face 6a of the magnetic pole 16a; as a result, a torque of the direction shown by an arrow A is generated. In other words, there is generated a torque to drive the rotor 1 to the direction shown by the arrow A. The relationship between the salient pole 1a and the magnetic poles 16f and 16a shown is in FIG. 5 is equal to the relationship between the salient pole 1b and the magnetic poles 16c and 16d which are axially symmetrical with the former. Thus, leakage flux generated between the salient pole 1b and the magnetic poles 16c and 16d will generate a torque to drive the rotor 1 towards the same direction (shown by the arrow A) simultaneously with the generation of the aforesaid torque.

In the case where the rotor 1 is provided with three or more salient poles, the broken line representing a mechanical angle of 360° is shifted towards the right-hand side in the development diagram of FIG. 4, and salient poles 3c, . . . are to be added to salient poles 3a and 3b of the position detecting rotor 3 while salient poles 1c, . . . are to be added to salient poles 1a and 1b of the rotor 1, and the number of magnetic poles is to be increased in accordance with these additional salient poles.

Figure 10:
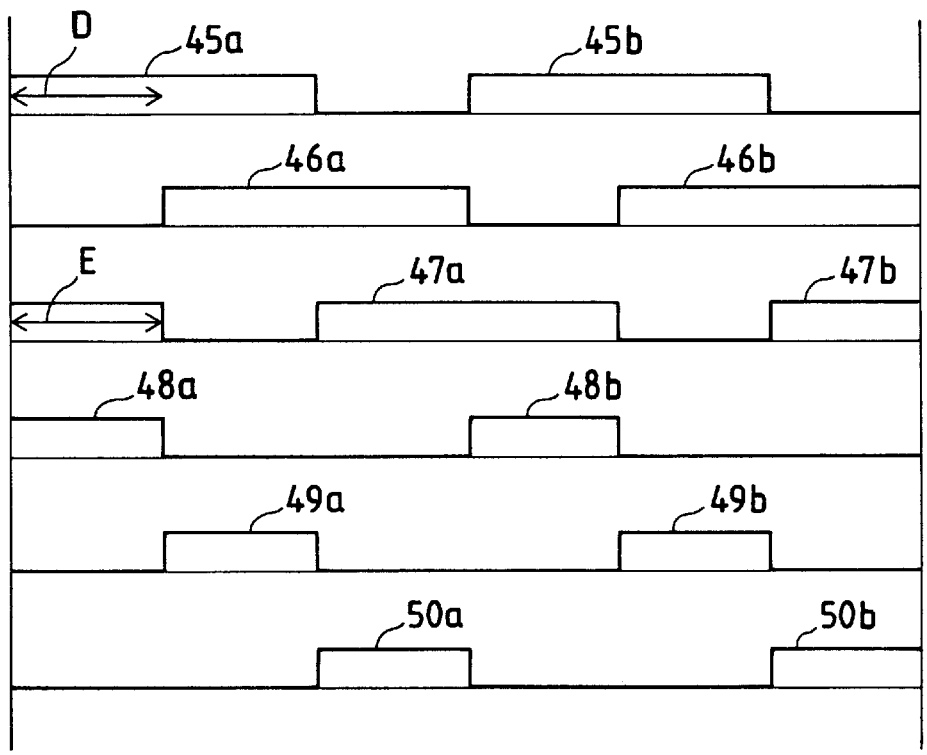
FIG. 10 is a time chart of a positional detection signal curve of the three-phase reluctance motor.

As seen from the above explanation, in the three-phase reluctance motor of the present invention, power is supplied to the first-, second- and third-phase armature coils 39a, 39b and 39c respectively by 240°, as represented by curves 45a, 45b, . . . , 46a, 46b, . . . and 47a, 47b, . . . in FIG. 10, whereby two adjacent armature coils 39a–39b, 39b–39c, 39c–39a can be successively supplied with power by 120° at the same time. More specifically, as shown in FIG. 10, power supply is simultaneously made between the third- and first-phase armature coils 39c and 39a, as shown by curves 48a, 48b, . . . , and the same applies between the first- and second-phase armature coils 39a and 39b, as shown by curves 49a, 49b, . . . and between the second- and third-phase armature coils 39b and 39c, as shown by curves 50a, 50b, . . . As a result, a large output torque can be developed, and the reason will be described below.

When armature coils of magnetic poles 16f and 16a are simultaneously supplied with power to polarize magnetic poles 16f and 16a as a N pole and as a S pole, respectively, magnetic flux is circulated as shown by a broken line F in FIG. 5. In this case, confronting area between the salient pole 1a and the magnetic pole 16f is larger than confronting area between the salient pole 1a and the magnetic pole 16a, so that reluctance is low between the salient pole 1a and the magnetic pole 16f, and magnetic flux quantity becomes large. When such a large magnetic flux is circulated from the magnetic pole. 16f to the salient pole 1a, and further, from the salient pole 1a to the magnetic pole 16a, leakage flux 25a effective for developing torque in accordance with the circulation. This serves to generate a large torque.

The above is the reason why the reluctance motor of the present invention can provide a large output torque. The larger the numbers of magnetic and salient poles are, the larger the obtainable output torque is. The number of salient poles of the rotor is two 1a, 1b in an example shown in FIG. 2. However, the number of salient poles may be three 1a, 1b, 1c. In the latter case, the broken line B is shifted by 360° toward the right-hand side in the development diagram of FIG. 4. If the number of salient poles is further increased, output torque will increase in proportion to the number of salient poles.

Figure 1:
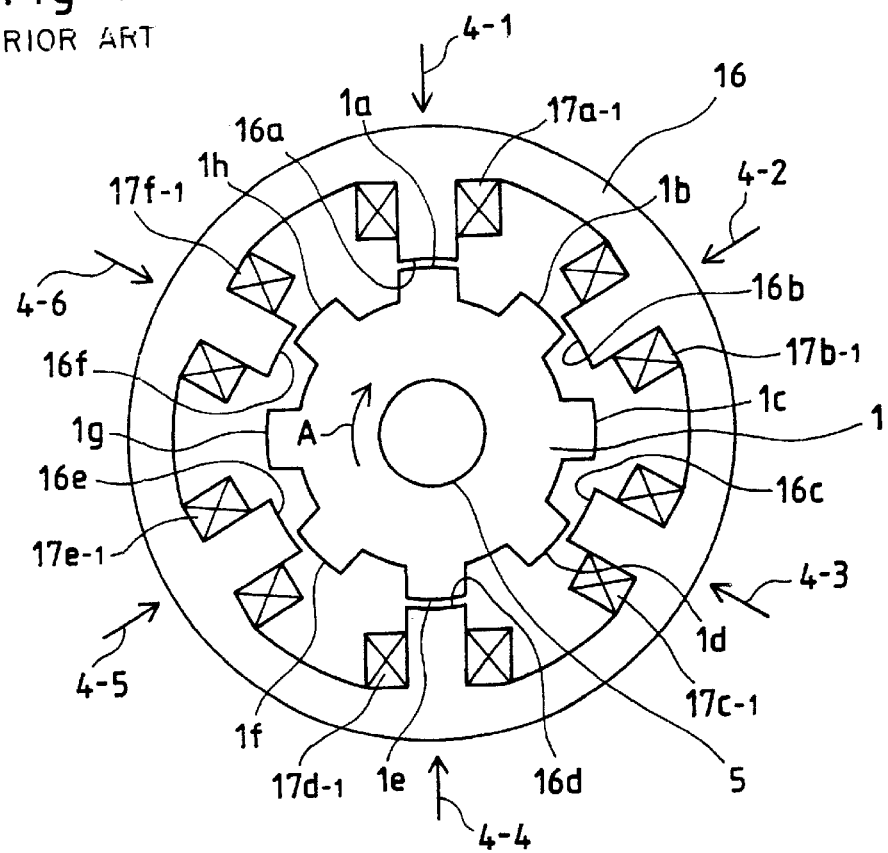
FIG. 1 is a cross sectional view of a stator armature and a rotor of a conventional reluctance motor.

The conventional type motor shown in FIG. 1 has six salient poles 1a, 1b, . . . However, salient poles effective for output torque are only two of them (for example, salient poles 1a and 1e at a time). In the motor shown in FIG. 1, the stator armature 16 deforms due to magnetic attraction force acting in the directions of arrows 4-1 and 4-4 exerted by salient poles 1a and 1e. When the rotor rotates by 120° from the current position, the stator armature 16 deforms due to magnetic attraction force acting in the directions of arrows 4-2 and 4-5 exerted by salient poles 1b and 1f. Further, when the rotor rotates by 120°, the stator armature 16 deforms due to magnetic attraction force acting in the directions of arrows 4-3 and 4-6. In the case of the stator armature 16 of the motor shown in FIG. 1, deforming directions varies as the rotor 1 rotates, thus causing a drawback of vibration of the motor.

In the case of the present invention, however, there are provided three or more salient poles and attraction force is simultaneously generated with respect to all salient poles, so that a compression force is exerted only in the circumferential direction of the stator armature 16, and no deformation occurs therein, thereby preventing the vibration. Moreover, according to the present invention, if there are provided six salient poles, output torque, three times that of the conventional motor having six salient poles as shown in FIG. 1, can be developed.

Figure 3:
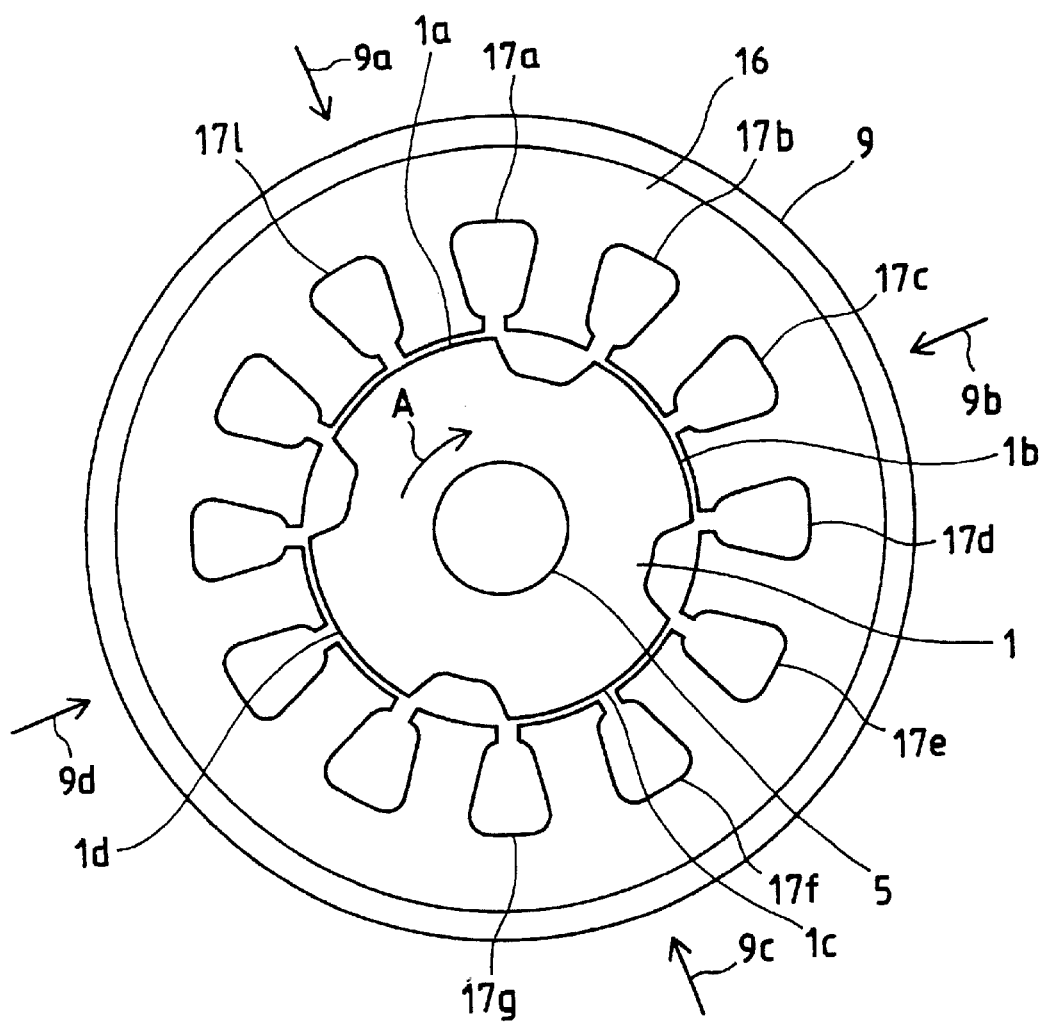
FIG. 3 is a cross sectional view of a stator amature and a rotor of a three-phase reluctance motor according to another embodiment of the present invention.

Referring now to FIG. 3, another embodiment of the present invention will be described below, showing a rotor which is formed with four salient poles. An inner circumferential surface of the armature 16 is formed with twelve slots 17a, 17b, 17c, . . . 17l at equal angular intervals. An armature coil is wound around two adjacent slots (e.g., 17a and 17b, 17b and 17c, . . . 17l and 17a) among these slots.

On the other hand, the outer periphery of the rotor 1 is formed with four salient poles 1a, 1b, 1c and 1d. When three-phase armature coils are supplied with power, salient poles 1a, 1b, 1c and 1d are magnetically attracted, causing the rotor 1 to rotate in the direction of an arrow A. In this case, a force for attracting the armature 16 acts in the directions of arrows 9a, 9b, 9c and 9d and thus a force for distorting the armature 16 is offset and disappears. Thus , this serves to solve the problem such that the armature 16 is distorted by being attracted by the salient poles 1a and 1b, as in the case of the embodiment illustrated in FIG. 2.

Discussed above is a case of three-phase half-wave power supplying. However, the present invention is also applicable to the case of three-phase full-wave power supplying. Further, four-phase power supplying is also possible. In this case, an exciting interval is 90°.

Figure 9:
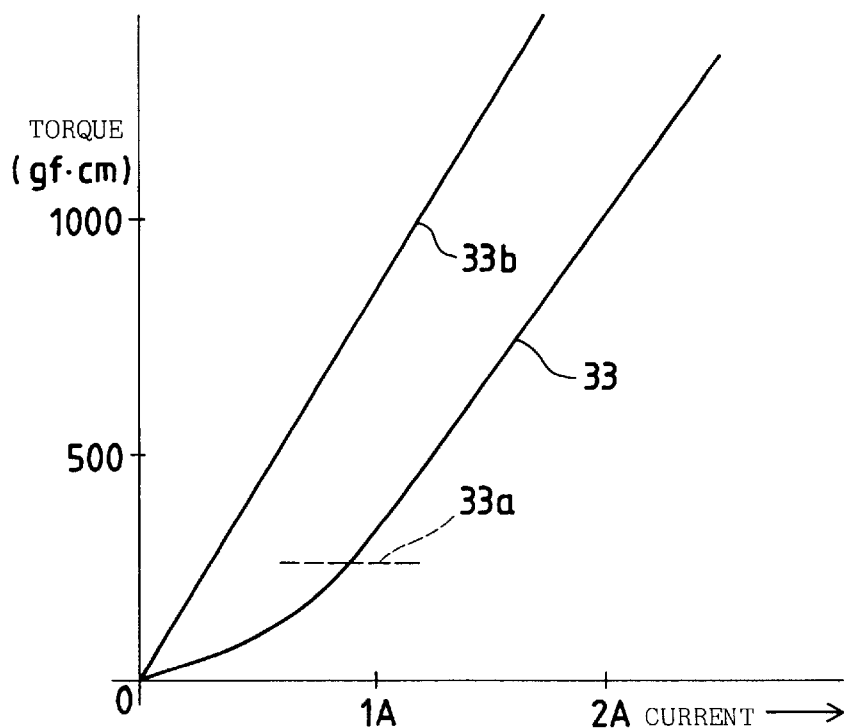
FIG. 9 is a graph showing a relationship between the exciting current to the armature coil and output torque.

A curve 33 in FIG. 9 represents the relationship between torque and exciting current of the conventional reluctance type motor, and is a quadratic curve in its initial stage. In the case of the conventional magnetic motor, magnetic poles cannot be excited beyond the range of the magnetic field of its magnet, so that the torque is saturated at a broken line 33a, and torque larger than the broken line can not be obtained. Since it is characteristic of the motor of the present invention to provide output torque by taking advantage of leakage flux, the quantity of leakage flux is proportional to the value of current. As a result, the relationship between torque and exciting current becomes linear as shown by curve 33b, so that the output torque proportional to the exciting current can be stably obtained.

As described above, the reluctance type motor of the present invention is capable of providing the effects such as preventing a vibration and linearizing the relationship between exciting current and torque.

What is claimed is:

1. A polyphase (N phase: N being a positive integer greater than or equal to 3) reluctance motor comprising:

a rotor formed of a soft magnetic substance which is provided with n units of salient poles (n being a positive integer greater than or equal to 2) of the same width and the same interval in a circumferential direction thereof;

a stator having m×n (m is an integer greater than or equal to 3) units of magnetic poles which are formed by winding an armature coil around each two adjacent slots out of m×n units of slots formed at equal intervals in a circumferential direction thereof, said armature coils being connected to constitute a first-phase armature coil, a second phase armature coil, a third-phase armature coil, through an Nth-phase armature coil;

means for rotatably supporting said rotor with respect to said stator armature so that said salient poles of said rotor and said magnetic poles of said stator confront each other through a slight gap;

position detecting units for detecting a rotational position of each salient pole of said rotor, and outputting first-phase, second-phase, third-phase, through Nth-phase position detection signals of the same width, which are successively delayed by a predetermined period;

semiconductor switching elements connected in series to each of said first-phase armature coil, second armature coil, third-phase armature coil, through Nth-phase armature coil;

a DC power source which supplied power to each of said phase armature coils through said semiconductor switching elements connected in series therewith; and a power-supply control circuit for controlling the activation of said semiconductor switching elements according to said first-phase, second phase, third-phase, through the Nth-phase position detection signals outputted from said position detecting units, so that said first-phase armature coil may be supplied with power simultaneously with said second-phase armature coil during a section, said second-phase armature coil may be supplied with power simultaneously with said third-phase armature coil during a section, through said Nth-phase armature coil which may be supplied with power simultaneously with said first-phase armature coil during a section, wherein a first magnetic pole formed in said stator is magnetized simultaneously with a second magnetic pole adjacent thereto in a predetermined direction in a manner such that one is a magnetized North pole while the other is a magnetized South pole, then, the second magnetic pole is magnetized simultaneously with a third magnetic pole adjacent thereto in a predetermined direction in a manner such that one is a magnetized North pole while the other is a magnetized South pole, and then, the third magnetic pole adjacent thereto in a predetermined direction in a manner such that one magnetized North pole while the other is magnetized South pole up to m×n magnetic poles, thereby generating a leakage flux passing through one of two adjacent magnetic poles, of which a confronting area with a salient pole is smaller, which Is effective for developing a torque between the magnetic poles and the salient pole, and of which quantity is determined according to the quality of the magnetic flux passing through the other of the above adjacent magnetic poles.

2. The polyphase reluctance motor according to claim 1, wherein said polyphase reluctance motor is a three-phase (N=3) motor, said rotor of soft magnetic substance has two (n=2) salient poles of 240° width in electric angle which are arranged symmetrically about the axis, said stator armature is formed with six (m=3) slots, and when these six slots are called a first slot, a second slot, a third slot, through a sixth slot according to their arrangement order, a first-phase armature coil is constituted by connecting in series armature coils wound around said first and second slots to armature coils wound around said fourth and fifth slots, a second-phase armature coil is constituted by connecting in series armature coils wound around said second and third slots to armature coils wound around said fifth and sixth slots, and a third-phase armature coil is constituted by connecting in series armature coils wound around said third and fourth slots to armature coils wound around said sixth and first slots; and said position detecting unit supplies a first-phase position detecting signal, which repeats a pulse width of 240° in electric angle at a high level and a pulse width of 120° in electric angle at a low level, to a semiconductor switching element associated with said first-phase armature coil, supplies a signal, which is delayed by 120° in electric angle from said first-phase position detecting signal as a second-phase position detecting signal, to a semiconductor switching element associated with said second-phase armature coil, and supplies a signal, which is delayed by 120° in electric angle from said first-phase position detecting signal as a third-phase position detecting signal, to a semiconductor switching element associated with said third-phase armature coil;

so that each of said two salient poles of said rotor acts to contribute to torque output without interruption.

3. The polyphase reluctance motor according to claim 1, wherein a counterflow blocking diode is interposed between one of the semiconductor switching elements connected to opposite sides of each of the armature coils of different phases and either positive pole or negative pole of said DC power source, and a capacitor is connected between said semiconductor switching elements;

when power supply to an armature coil is interrupted, said counterflow blocking diode prevents magnetic energy stored in said armature coil from returning to said DC power source side and changes said magnetic energy to said capacitor, and when power is supplied to said armature coil again, a voltage, resulting from adding a voltage of said charged capacitor to a voltage from said DC power source, is applied to said armature coil.

4. The polyphase reluctance motor according to claim 1, wherein an air gap between said salient poles and said magnetic poles is set less than $\frac{1}{10}$ millimeter.

* * * * *

UNITED STATES PATENT AND TRADEMARK OFFICE
CERTIFICATE OF CORRECTION

PATENT NO.    : 6,369,481 B1
DATED         : April 9, 2002
INVENTOR(S)   : Itsuki Bahn It is certified that error appears in the above-identified patent and that said Letters Patent is hereby corrected as shown below:

<u>Column 12,</u>
Line 26, change "Is" to -- is --.
Line 50, replace "said sixth and first slots" with -- said fifth and sixth slots, and a third-phase armature coil is constituted by connection in series armature coil wound around said third and fourth slots to armature coils wound around said sixth and first slots --.

Signed and Sealed this

Eighth Day of October, 2002

*Attest:*

*Attesting Officer*

JAMES E. ROGAN
*Director of the United States Patent and Trademark Office*